(12) United States Patent
Bar

(10) Patent No.: US 10,183,473 B2
(45) Date of Patent: Jan. 22, 2019

(54) SHEET PROCESSING SYSTEM

(71) Applicant: Aharon Bar, Rishon le Zion (IL)

(72) Inventor: Aharon Bar, Rishon le Zion (IL)

( * ) Notice: Subject to any disclaimer, the term of this patent is extended or adjusted under 35 U.S.C. 154(b) by 0 days.

(21) Appl. No.: 15/529,505

(22) PCT Filed: Nov. 30, 2015

(86) PCT No.: PCT/IL2015/051166
§ 371 (c)(1),
(2) Date: May 25, 2017

(87) PCT Pub. No.: WO2016/088121
PCT Pub. Date: Jun. 9, 2016

(65) Prior Publication Data
US 2017/0259549 A1 Sep. 14, 2017

(30) Foreign Application Priority Data

Dec. 4, 2014 (IL) .......................................... 236093

(51) Int. Cl.
| | |
|---|---|
| B32B 37/12 | (2006.01) |
| B32B 29/02 | (2006.01) |
| B32B 29/00 | (2006.01) |
| B32B 7/12 | (2006.01) |
| B32B 3/16 | (2006.01) |
| B32B 38/00 | (2006.01) |
| B32B 38/04 | (2006.01) |
| B32B 37/22 | (2006.01) |

(52) U.S. Cl.
CPC ............ *B32B 37/1284* (2013.01); *B32B 3/16* (2013.01); *B32B 7/12* (2013.01); *B32B 29/005* (2013.01); *B32B 29/02* (2013.01); *B32B 37/223* (2013.01); *B32B 38/0004* (2013.01); *B32B 38/145* (2013.01); *B32B 2038/047* (2013.01)

(58) Field of Classification Search
USPC ....... 156/384, 387, 510, 522, 524, 538, 552, 156/578
See application file for complete search history.

(56) References Cited

U.S. PATENT DOCUMENTS

| | | | | |
|---|---|---|---|---|
| 4,093,277 | A * | 6/1978 | Nolan ...................... | B41L 1/22 40/639 |
| 4,824,503 | A | 4/1989 | Wilen | |
| 5,645,932 | A | 7/1997 | Uchibori | |
| 5,763,128 | A * | 6/1998 | Malhotra ................. | B41M 3/12 430/11 |
| 6,171,683 | B1 * | 1/2001 | Trask ....................... | B29C 44/14 428/195.1 |
| 7,824,029 | B2 | 11/2010 | Jones et al. | |
| 2003/0167944 | A1 | 9/2003 | McKillip | |
| 2004/0221947 | A1 | 11/2004 | Haldner et al. | |
| 2005/0109850 | A1 * | 5/2005 | Jones ....................... | G06K 19/08 235/487 |

(Continued)

*Primary Examiner* — Sing P Chan
(74) *Attorney, Agent, or Firm* — Mark David Torche; Patwrite Law

(57) ABSTRACT

A sheet processing system for producing a printed item. The system includes a sheet feeding station to feed printed sheets one at a time, adjacently, to a laminating station to adhere a laminating material to the printed sheets, and a base item application station to apply a base item to the printed sheets, thereby turning each of the fed single printed sheets into a continuous printed sheet.

20 Claims, 5 Drawing Sheets

(56) References Cited

U.S. PATENT DOCUMENTS

| | | |
|---|---|---|
| 2006/0191426 A1 | 8/2006 | Timmerman et al. |
| 2006/0234014 A1* | 10/2006 | Liu ..................... B65D 33/34 428/195.1 |
| 2007/0012775 A1 | 1/2007 | Cote |
| 2007/0175573 A1 | 8/2007 | Fox et al. |
| 2008/0248261 A1* | 10/2008 | Bonnett ............... B41M 7/0045 428/195.1 |
| 2012/0132339 A1 | 5/2012 | Foley, Sr. et al. |
| 2012/0211154 A1 | 8/2012 | Brownell |
| 2014/0290834 A1 | 10/2014 | Egron et al. |

\* cited by examiner

SHEET PROCESSING SYSTEM

CROSS-REFERENCE TO RELATED APPLICATIONS

This application is a U.S. National Phase Application under 35 U.S.C. 371 of International Application No. PCT/IL2015/051166, which has an international filing date of Nov. 30, 2015, and which claims the priority benefit of Israel Patent Application No. 236093 filed Dec. 4, 2014, which is incorporated herein by reference in its entirety.

FIELD AND BACKGROUND OF THE INVENTION

The present invention, in some embodiments thereof, relates to printing systems and, more particularly, but not exclusively, to a system and a method for producing laminated printed items.

Production of laminated printed items such as magnetic stickers and paper-paper-based printed products is generally a multi-step process which requires specialized machinery for each stage of the production process. For example, a typical laminated printed item production process may include an initial lamination stage using a machine which may apply a laminate such as a transparent or translucent plastic film or cover to printed paper or other paper-based product (e.g. carton), or other type of printed material. Generally, the printed material is supplied in a roll, although it may also be supplied as single sheets.

Generally, the initial laminating stage may be followed by a second stage where a second machine may be used to adhere the laminated printed material to the surface of a base item, for example, to the surface of a magnetic sheet or a carton sheet. Prior to the second stage, in an optional intermediate stage, a machine may be used to emboss or embed the printing on the laminated printed material. In a third stage, a machine may be used to form perforations in the laminated printed material while adhered to the base item, outlining a shape of the final laminated item. In a fourth stage, cutting may be performed along the perforations, either manually or using a machine, to extract the final laminated printed item.

SUMMARY OF THE INVENTION

There is provided, according to an embodiment of the present invention, a sheets processing system for producing a flat laminated printed item, the system includes a sheet feeding station to feed a flat printed material to a laminating station; a laminating station to adhere a laminating material to the flat printed material; a base item application station to apply a base item to the laminated flat printed material; a platform to accommodate the sheet feeding station, the laminating station, the base item application station, and a transport roller station, aligned in a substantially straight line; and a transport roller station to transport along the platform at least a section of the laminated flat printed material which is a part of the flat laminated printed item.

According to an embodiment of the present invention, the flat printed sheet material is a paper-based material.

According to an embodiment of the present invention, the sheet feeding station includes an automatic sheet feeder.

According to an embodiment of the present invention, the laminating station includes a pressing roller to thermally adhere the laminating material to the flat printed material.

According to an embodiment of the present invention, the laminating station includes a laminating tension device to apply a tension to the laminated flat printed material.

According to an embodiment of the present invention, the base item includes any one of a rubber material, a silicone material, a polymer-based material, a magnetic material, a paper-based material, and a fabric.

According to an embodiment of the present invention, the base item application station includes an adhesive applying substation to apply an adhesive to an underside of the laminated flat printed material.

According to an embodiment of the present invention, the adhesive applying substation includes a top guide roller, a bottom guide roller, an epoxy container, an epoxy pump, and an epoxy applicator.

According to an embodiment of the present invention, the base item application station includes a base item supply subsystem to provide the base item.

According to an embodiment of the present invention, the base item supply subsystem includes a base item roll and a feed roller.

According to an embodiment of the present invention, the sheets processing system further includes an embedding/embossing station to embed or emboss the print on the laminated flat printed material, wherein the embedding/embossing station is aligned with the laminating station on the platform.

According to an embodiment of the present invention, the sheets processing system further includes a perforation station to perforate a predetermined shape of the laminated printed item on the laminated flat printed material, wherein the perforation station is aligned with the laminating station on the platform.

According to an embodiment of the present invention, the sheets processing system further includes an item cutting station to cut a predetermined shape of the laminated printed item on the laminated flat printed material and the applied base item, wherein the cutting station is aligned with the laminating station on the platform.

According to an embodiment of the present invention, the item cutting station includes a punch machine to punch out the predetermined shape from the laminated flat printed material and the applied base item.

According to an embodiment of the present invention, the item cutting station includes a cutting machine to cut out the predetermined shape from the laminated flat printed material and the applied base item.

According to an embodiment of the present invention, the sheets processing system further includes a laminated sheet collection station to separate and collect sections of the laminated flat printed material which do not form part of the laminated printed item, wherein the laminated sheet collection station is aligned with the laminating station on the platform.

According to an embodiment of the present invention, the sheets processing system further includes an item collection station to allow collection of the laminated printed item, the item collection station positioned on the platform between base item application station and the transport roller station.

According to an embodiment of the present invention, the item collection station includes a conveyor to transport the laminated printed item to a collection container.

According to an embodiment of the present invention, the item collection station includes a collection container to collect the laminated printed item.

According to an embodiment of the present invention, the item collection station includes an opening through which the laminated printed item drops into any one of a conveyor and a collection container.

BRIEF DESCRIPTION OF THE DRAWINGS

Some embodiments of the invention are herein described, by way of example only, with reference to the accompanying drawings. Details shown are for exemplary purposes and serve to provide a discussion of embodiments of the invention. The description and the drawings may be apparent to those skilled in the art how embodiments of the invention may be practiced.

DETAILED DESCRIPTION

Figure 1:
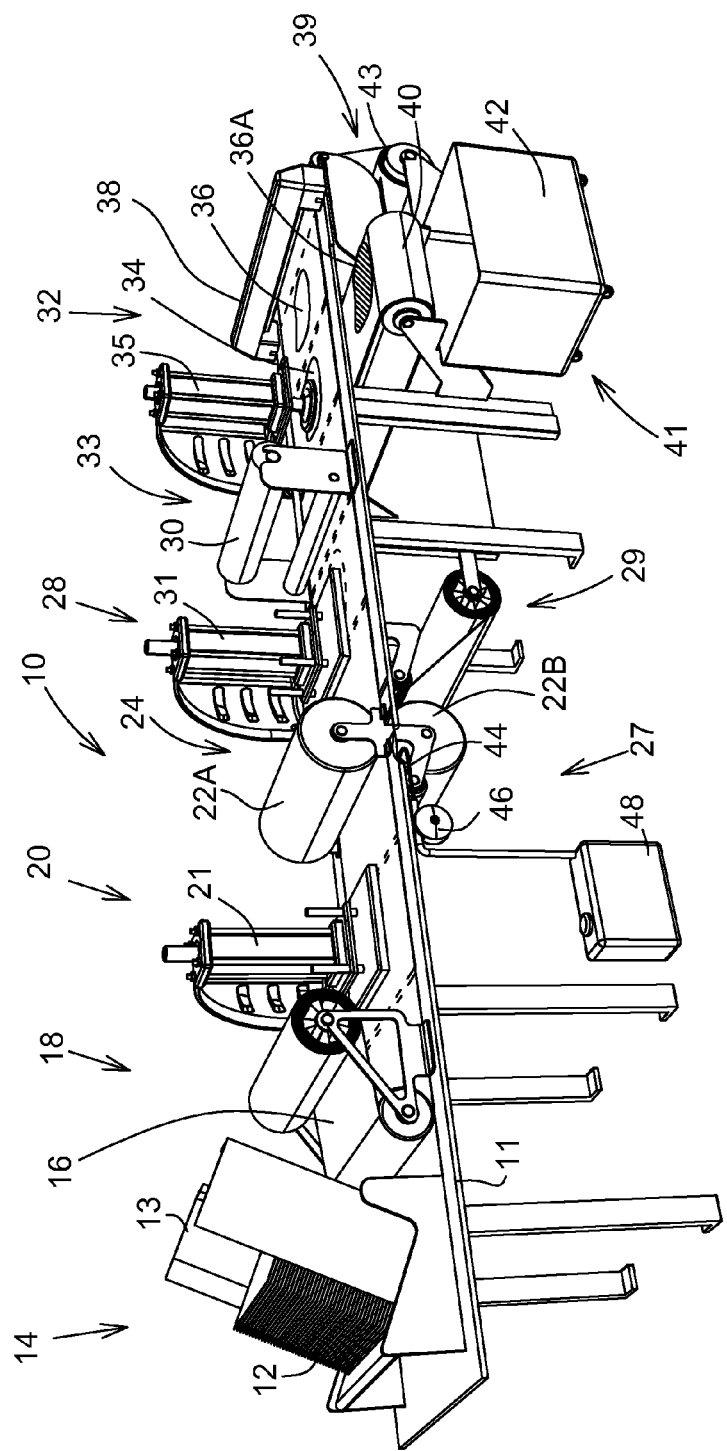
FIG. 1 schematically illustrates a perspective view of a front side of an exemplary automatic sheet processing system (SPS), according to an embodiment of the present invention.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Known methods for producing laminated flat printed items typically involve use of a combination of different types of machines, for example, a printing machine, a laminating machine, an embossing/embedding machine, a base item application machine, a perforating machine, and a cutting machine. The machines are generally set up as individual stations spread out over the floor of a printing facility and generally require an operator at each station. Furthermore, large floor areas may be required to accommodate all the individual machines and to allow for operator machine and product manipulation. The requirement for a large floor area, for multiple stations, and for relatively large amounts of manpower to operate all the machines, have generally limited production of laminated flat printed items to large printing companies capable of producing large volumes of laminated printed items in order to make their production feasible. Attempts have been made to integrate all the stations into single automatic systems but the costs of such systems are high, again limiting production to large volumes.

In an attempt to allow smaller printing companies to produce smaller amounts at relatively feasible production costs, they typically purchase the laminated material in "ready-form" adhered to the base item, and without the printing. The small printing company may then perform the printing on the laminated material, including embossing/embedding as may be required, and may perform the perforating and/or cutting as may be required. A drawback associated with this method is that the printing is made onto the laminated material and not directly onto the surface of the material prior to lamination, so that the quality of the printing is reduced. Another drawback is that the laminated material in ready-form is relatively costly, and generally comes in rolls of predetermined lengths which are not always fully utilized by the small printing company, further increasing the cost of the material.

Applicant has realized that the drawbacks associated with known methods for producing laminated flat printed items may be potentially remedied by a single automatic sheet processing system that integrates all the functions provided by the multiple stations used by the large printing companies but which may allow small production runs as required by the small printing companies. Such a system may allow the small printing company to perform its own printing and laminating, and to adhere the base item to the laminated printed material.

Applicant has further realized that such a system may reduce the high production costs frequently associated with producing laminated printed items by reducing, if not eliminating, need for multiple expensive stations required for high volume production; need for multiple station operators (i.e. system is automatic and may require only one operator to monitor operation); need for large floor areas as all the stations are integrated into a single unit; and need to train machine operators as the system is automatic and only one operator may be required. Production costs may also be reduced, particularly for the small printing company, by reducing, if not eliminating, need to purchase laminated material in ready-form rolls, and by allowing use of flat printed sheet materials reducing possible waste of material as may be typically encountered when using the ready-form rolls.

Applicant has also realized that setting up the automatic sheets processing system with multiple stations arranged in a single, substantially straight line, and with a transport system to transport the item through the various production stages along such a straight line, may contribute to substantial savings in pre-production setup expenses compared to the known methods. These savings may amount to up to 20% reduction in the setup expenses, as the time and costs associated with manual item alignment of each and every item at each station are substantially eliminated. These savings may in turn provide greater flexibility regarding minimum production amounts which may be handled by the automatic sheets processing system.

Figure 2:
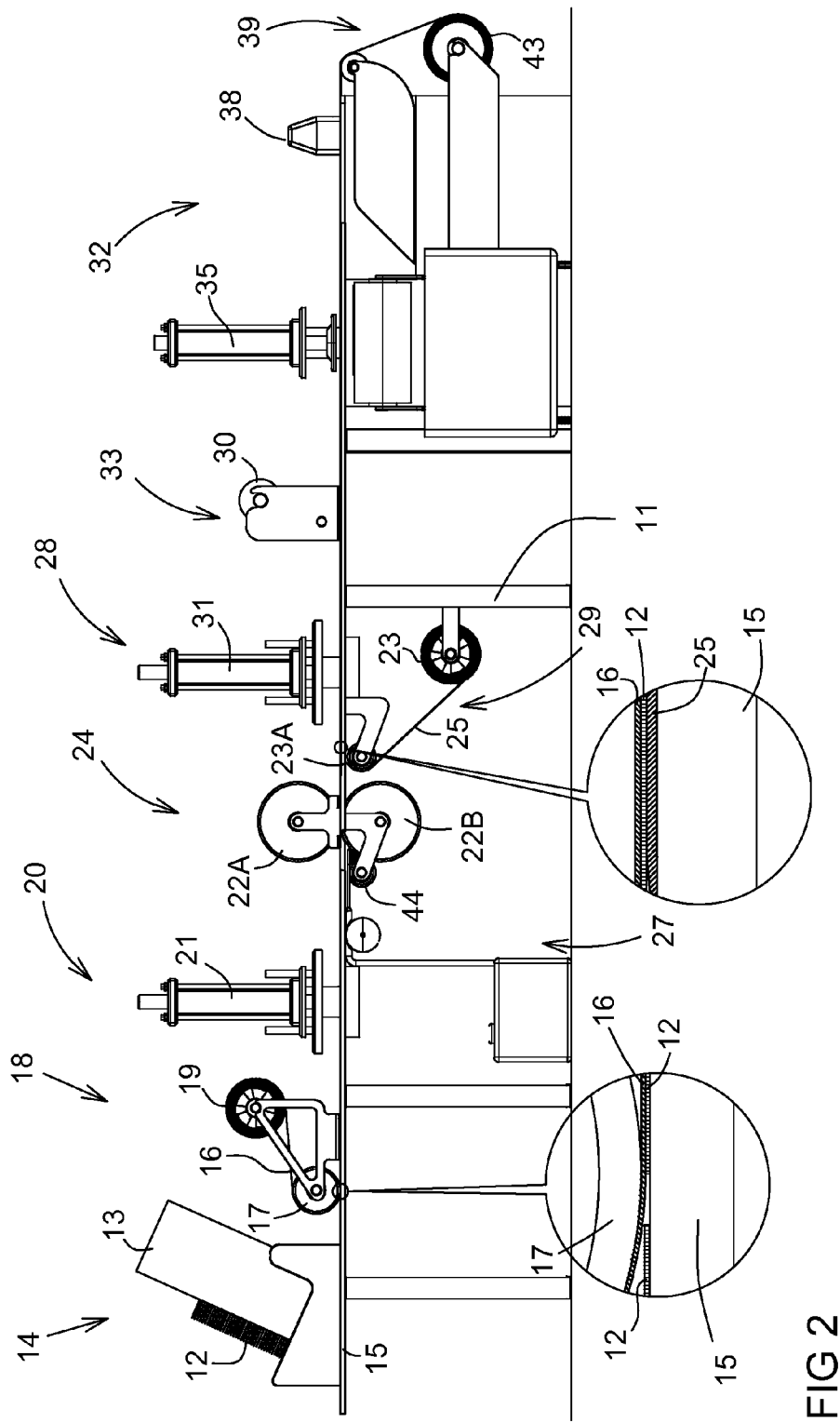
FIG. 2 schematically illustrates a side view of the SPS, according to an embodiment of the present invention.

FIG. 1 schematically illustrates a perspective view of a front side of an exemplary automatic sheet processing system (SPS) 10, according to an embodiment of the present invention. Reference is also made to FIG. 2, which schematically illustrates a side view of SPS 10, according to an embodiment of the present invention. SPS 10 may include a sheet feeding station 14, a laminating station 18, an optional embossing/embedding station 20, a base item application station 24, a perforation station 28, an optional non-perforated laminated sheet collection station 33, an optional item cutting station 32, a transport roller station 39, and a platform 11 on which the stations are positioned sequentially in a substantially straight line. Additionally, SPS 10 may include an item collection station 41.

Sheet feeding station 14 may be the first station in SPS 10 and include an automatic feeder 13 to accommodate printed sheets 12, which may include paper sheets or other flat paper-based products having printed matter such as shapes, figures, letters, and/or numbers (for convenience hereinafter referred to as "printed sheets"). Printed sheets 12 may be subject to lamination and adhered to a base item to form adherable stickers such as magnetic stickers, labels, bumper stickers, wall stickers, paper stickers, as well as other types of flat laminated printed items.

Laminating station 18 may be the next station in SPS 10 and may include a laminating material roll 19 and a pressing roller 17. Laminating material roll 19 provides a laminating material 16 which may include a transparent or translucent plastic film or other type of polymer cover, which may be thermally adhered to an upper side of printed sheet 12 by pressing roller 17 as the printed sheet is fed between the pressing roller and a surface top 15 of platform 11. A detailed drawing is shown in FIG. 2 illustrating printed sheet 12 with laminating film 16 thermally adhered to its upper side by pressing roller 17.

Embedding/embossing station 20 may include an embedding/embossing press machine 21, which may be used to embed or emboss the printed matter on laminated printed sheet 12. Embedding/embossing station 20 may be an optional intermediate station in SPS 10 following laminating station 18, and may be either temporarily installed in the SPS as required for embedding/embossing printed processes, or may be permanently mounted on platform 11 and only used when required.

Base item application station 24 may be the next station in SPS 10, following laminating station 18 and optionally following embedding/embossing station 20. Base item application station 24 may adhere an underside of laminated printed sheet 12 to an upper side of a base item 25, which may include a silicone material (e.g. silicone paper), a rubber, or other polymer material, and may serve as a base for an underside of the flat laminated printed item. Base item 25 may include a magnetic material. Additionally or alternatively, base material may include an applied adhesive on an underside of the base item covered with a removable adhesive resistant material (e.g. silicone) paper or fabric.

Base item application station 24 may include an adhesive applying subsystem 27 and a base item supply subsystem 29. Adhesive applying subsystem 27 may include an epoxy container 48, an epoxy pump 46, an epoxy applicator 44, a top guide roller 22A and a bottom guide roller 22B. Epoxy container 48 may be any type of container suitable for storing glue or other type of epoxies which may be used for adhering laminated printed sheet 12 to base item 25. Epoxy pump 46 may apply epoxy by means of epoxy applicator 44 to bottom guide roller 22B which may in turn apply the epoxy to the underside of laminated printed sheet 12 as it passes between top guide roller 22A and bottom guide roller 22B. Top guide roller 22A guides laminated printed sheet 12 between the two rollers as the epoxy is applied to the underside. Base item supply subsystem 29 may include a base item roll 23 and a feed roller 23A. Base item supply roll 25 may be positioned on an underside of platform 11 and may supply base item 25 which is fed to surface top 15 by feed roller 23A, where it is adhered to the epoxy-coated underside of laminated printed sheet 12. A detailed drawing is shown in FIG. 2 illustrating printed sheet 12 with laminating film 16 adhered to its upper side and with base item 25 adhered to its underside.

Perforation station 28 may be the next station in SPS 10 following base item application station 24. Perforation station 28 may include a perforating machine 31 for creating perforations on laminated printed sheet 12 while adhered to base item 25. The perforations may be according to a predetermined pattern, and which may be associated with a shape of the final printed laminated item (see laminated item 36A). The perforations may be made only on laminated printed sheet 12 and not on base item 25, or alternatively, may be made on both the laminated printed sheet and the base item. The perforations may be partial perforations to allow easy removal of the perforated shapes later on, either by machine, or manually by an operator or a final user of laminated item 36A. Alternatively, the perforations may be complete perforations separating the perforated shape on laminated printed sheet 12 which form laminated item 36 from non-perforated sections on the sheet. Perforation station 28 may be an optional intermediate station in SPS 10 following base item application station 24, and may be either temporarily installed in SPS when required, or may be permanently mounted on platform 11 and only used when required.

Figure 3:
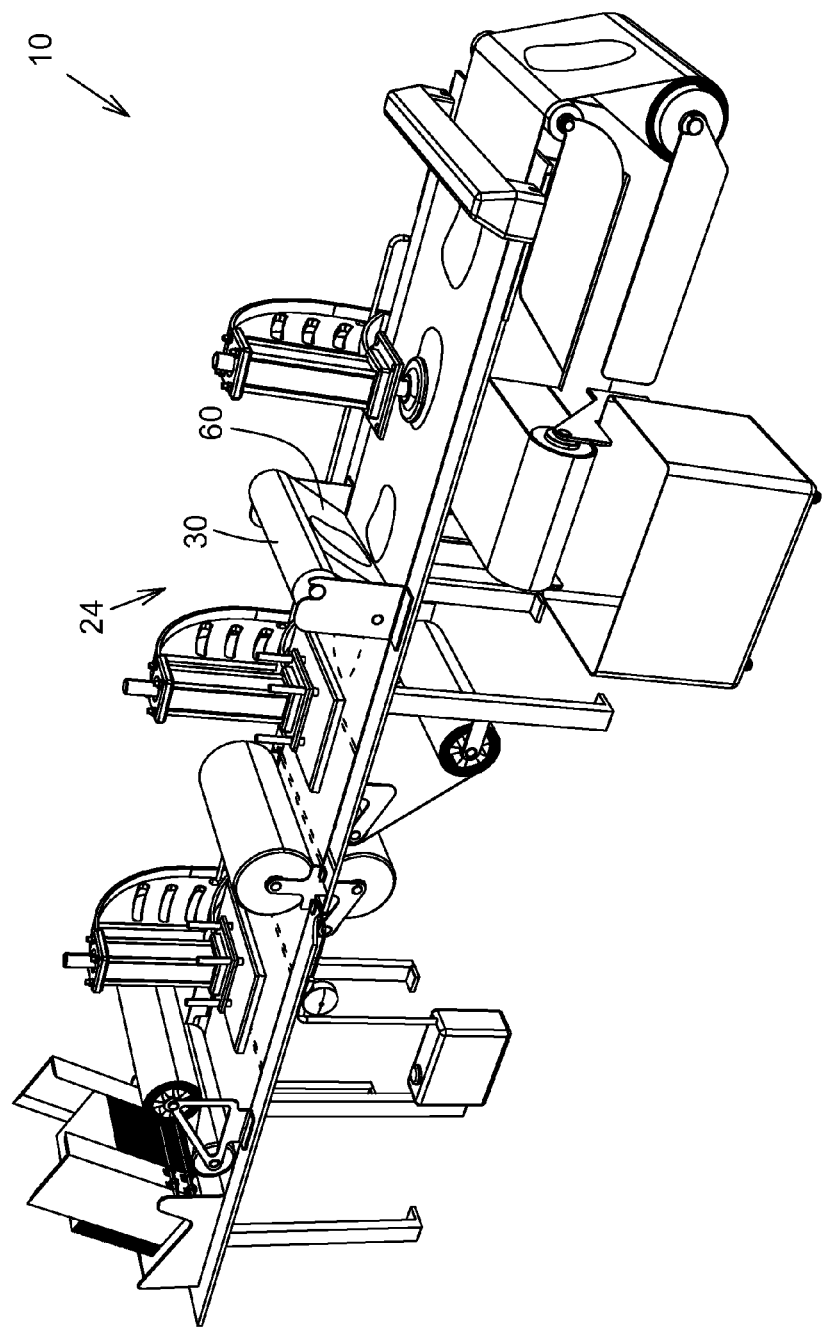
FIG. 3 schematically illustrates a perspective view of the SPS with a laminated sheet collection station used to separate and collect sections of laminated printed sheet which do not form part of a final laminated item, according to an embodiment of the present invention.

Laminated sheet collection station 33 may include a collection roller 30 which may be used to separate from base item 25 sections of laminated printed sheet 12 which do not form part of final laminated item 36A, and to collect the separated sections 60 on the roller, as shown in FIG. 3. Laminated sheet collection station 33 may be an optional intermediate station in SPS 10 following perforation station 28, and may be either temporarily installed in SPS when required, or may be permanently mounted on platform 11 and only used when required. In some embodiments of the present invention, laminated sheet collection station 33 may also be used as a transport mechanism with collection roller 30 pulling on laminating film 16 to transport adhered printed sheet 12 through stations 18, 20, 24, and 28 until collection by the roller.

Item cutting station 32 may include a punch machine 35 and/or a cutting machine 38, which may be used in place of perforation station 24 or alternatively, may supplement the perforation station. Punch machine 35 may be used to cut out a predetermined shape of final laminated item 36A from laminated printed sheet 12 adhered to base item 25 (i.e. the shape is separated from the laminated printed sheet adhered to the base item). Cutting machine 38 may be used to cut predetermined rectangular shapes from laminated printed sheet 12 adhered to base item 25. Item cutting station 32 may be an optional intermediate station in SPS 10 following laminated sheet collection station 33, and punch machine 35 and/or cutting machine 38 may be either temporarily installed in SPS when required, or may be permanently mounted on platform 11 and only used when required.

An item collection station 41 may be the next station in SPS 10 following any one of the optional stations 28, 33, and 32, and may serve to collect final laminated item 36 in any one of its forms (perforated shapes, punched out shapes, cut out rectangular shapes, or other possible shapes and/or combinations of the preceding). Item cutting station 32 may be in communication with item collection station 41 by means of an opening through which final laminated item 36A may drop onto a conveyor 40 which transports the final laminated item to a collection container 42. As may be appreciated from FIG. 1, the opening through which final laminated item 36A drops onto conveyor 40 may be seen through an opening 36 formed in laminated printed sheet 12 adhered to base item 25. Alternatively to the use of conveyor 40, collection container 42 may be placed directly under opening 36 and onto which may drop the cut or punched out final laminated item 36A. Alternatively, final laminated item 36A may be manually acquired by an operator while on surface top 15, so that opening 36 may not be required.

Transport roller station 39 may include a collection roller 43 and may provide a transport mechanism for pulling on laminating film 16 to transport laminated printed sheet 12 through the stations of SPS 10. Laminated printed sheet 12 may be transported through stations also while adhered to base item 25 and may be collected by collection roller 43 following prior collection of final laminated item 36A. Alternatively, prior collection of final laminated item 36A may not be performed, and accumulated on collection roller 43 for further processing. Alternatively, transport roller station 39 may pull on base item 25 with attached perforated shapes of final laminated item 36A while sections 60 of laminated printed sheet 12 which do not form part of the final laminated item are collected by laminated sheet collection station 33. Following prior collection of final laminated item 36A, remaining base item may be collected by collection roller 43. Alternatively, base item 25 including final laminated item 36A may be collected on collection roller 43 for further processing.

Figure 4:
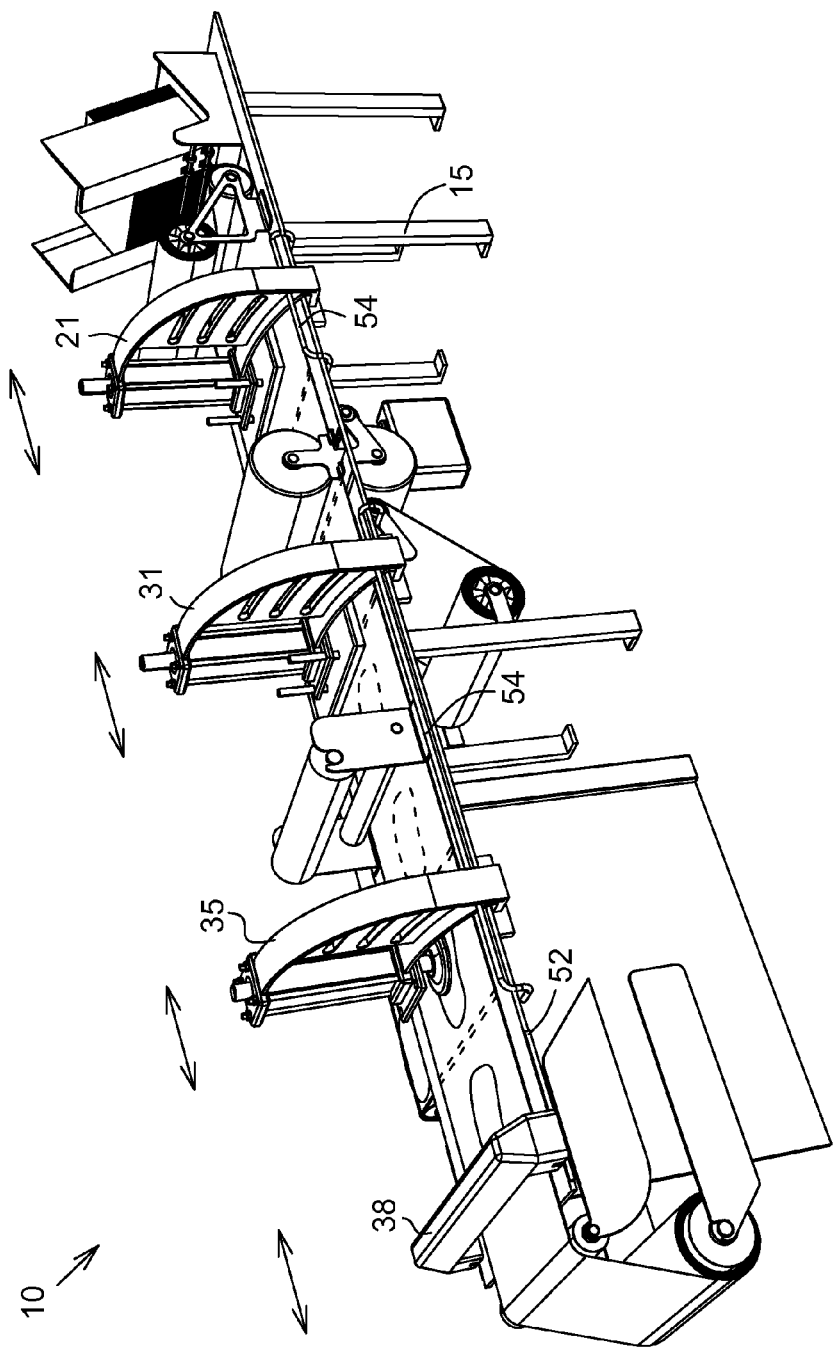
FIG. 4 schematically illustrates a perspective view of a back side of the SPS, according to an embodiment of the present invention.

FIG. 4 shows a perspective view of a back side of SPS 10, according to an embodiment of the present invention. SPS 10 may be configured to allow adjusting, and optionally interchanging, a position on platform 15 of any one of embedding/embossing machine 21, perforation machine 31, punch machine 35, and cutting machine 38.

Platform 15 may include tracks 52 onto which machines 21, 31, 35, and 38 may be removably attached as required, and which may allow moving the machines linearly to any position along the tracks. The possibility to position the machines anywhere along tracks 52 may allow for interchangeability in the sequence of the machines depending on the production requirements of the final laminated item 36, and may further allow for better alignment of the machines during pre-production setup. Movement of machines 21, 31, 35 and 38 along tracks 52 may be facilitated by pneumatic means 54, which may be used to power movement mechanisms in the various machines. Additionally or alternatively, movement may be facilitated by electromechanical means such as motor driven gears or wheels, among other possible electromechanical movement mechanisms.

Figure 5:
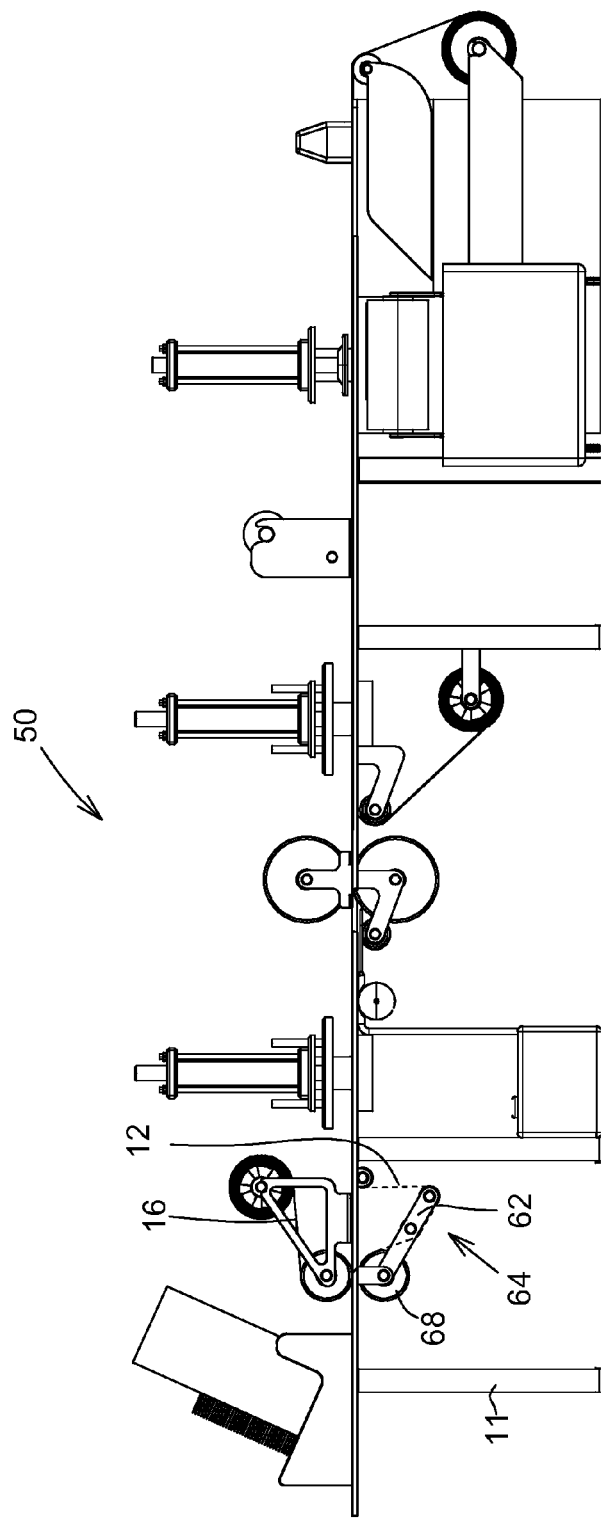
FIG. 5 schematically illustrates a side view of an exemplary SPS including a laminating film tension device, according to an embodiment of the present invention.

FIG. 5 shows a side view of an exemplary SPS 50, according to an embodiment of the present invention. SPS 50 may be similar to SPS 10 but may include a laminating film tension device 64 similar to laminating film tension devices known in the art.

Laminating film tension device 64 may include a feed roller 68 and a rotatable lever 62 attached to an underside of platform 11. Laminating film tension device 64 may serve to delay feeding of laminated film 16 and thereby laminated printed material 12 through SPS 50 for very small durations to maintain a predetermined tension on the laminated printed material as it is being processed through the SPS. SPS 50 may be fitted with laminating film tension device 64 at various locations throughout platform 11 to control tension at several points along the production process.

Thus, in one aspect, the invention is directed to a sheets processing system, including:

a sheet feeding station, for feeding and placing a single printed sheet, one at a time, on at least one continuous sheet, such as of a laminating material and/or of a removable sticker, one printed sheet adjacent to the other; and a pressing roller, for moving the at least one continuous sheet, and for pressing thereof on the printed sheets, for adhering the at least one continuous sheet to the printed sheets, thereby turning the separated printed sheets a continuous printed sheet, thereby allowing utilizing any separated sheet printer (not shown in the figures), being the most standard minter, for producing the continuous printed sheet.

After the production of the continuous printed sheet, any improving station, such as cutter, may be applied to the continuous printed sheet.

The at least one continuous sheet may be a laminating material, or a base item, being an adherable removable sticker sheet, or a magnetic sheet, or any other layer.

In the figures and/or description herein, the following reference numerals have been mentioned:

| REFERENCE NO. | PART DESCRIPTION |
| --- | --- |
| 10 | Automatic Sheets Processing System (SPS) |
| 11 | Platform |
| 12 | Printed sheet material |
| 13 | Automatic feeder |
| 14 | Sheet feeding station |
| 15 | Surface top |
| 16 | Laminating material (film) |
| 17 | Pressing roller |
| 18 | Laminating station |
| 19 | Laminating material roll |
| 20 | Embossing/embedding station |
| 21 | Embedding/embossing (press) machine |
| 22A | Top guide roller |
| 22B | Bottom guide roller |
| 23 | Base item roll |
| 23A | Feed roller |
| 24 | Base item application station |
| 25 | Base item |
| 27 | Adhesive applying subsystem |
| 28 | Perforation station |
| 29 | Base item supply subsystem |
| 30 | Collection roller |
| 31 | Perforation machine |
| 32 | Item cutting station |
| 33 | Laminated sheet collection station |
| 35 | Punch machine |
| 36 | Opening (collection) |
| 36A | Laminated item (final) |
| 38 | Cutting machine |
| 39 | Transport roller station |
| 40 | Conveyor |
| 41 | Item collection station |
| 42 | Collection container |
| 43 | Collection roller |
| 44 | Epoxy pump |
| 46 | Epoxy applicator |
| 48 | Epoxy container |
| 50 | SPS |
| 52 | Tracks |
| 54 | Pneumatic means |
| 60 | Separated sections |
| 62 | Rotatable lever |
| 64 | Laminating film tension device |
| 68 | Feed roller |

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A sheet processing system, comprising:

a sheet feeding station, configured to feed and place single and separate printed sheets, one at a time, on at least one continuous sheet, one printed sheet adjacent to the other; and a pressing roller configured to move said at least one continuous sheet, and to adhere the at least one continuous sheet on said printed sheets, thereby turning each one of the fed single and separate printed sheets into, a continuous printed sheet, thereby allowing utilizing a separated sheet printer for producing said continuous printed sheet.

2. The system according to claim 1, wherein said at least one continuous sheet comprises a laminating material.

3. The system according to claim 1, wherein said at least one continuous sheet comprises a base item, selected from a group including: an adherable removable sticker sheet and magnetic sheet.

4. The system according to claim 1,
wherein said sheet feeding station is configured to feed said printed sheets to a laminating station;
wherein said laminating station is configured to adhere said continuous sheet to said printed sheets to produce a laminated printed sheet;
wherein said pressing roller comprises a base item application station configured to apply said at least one continuous sheet comprising a base item to said printed sheets; and
wherein said sheets processing system further comprises:
a platform configured to accommodate said sheet feeding station, said laminating station, said base item application station, and a transport roller station, aligned in a substantially straight line; and
a transport roller station configured to transport said printed sheets along said platform.

5. The system according to claim 4, wherein said printed sheets are of a paper-based material.

6. The system according to claim 4, wherein said sheet feeding station comprises an automatic sheet feeder.

7. The system according to claim 4, wherein said laminating station comprises a pressing roller configured to thermally adhere said laminating material to said printed sheets.

8. The system according to claim 4, wherein said laminating station comprises a laminating tension device configured to apply tension to said laminated printed sheets being laminated.

9. The system according to claim 4, wherein said base item comprises any one of a rubber material, a silicone material, a polymer-based material, a magnetic material, a paper-based material, and a fabric.

10. The system according to claim 4, wherein said base item application station comprises an adhesive applying substation configured to apply an adhesive to an underside of said laminated printed sheets.

11. The system according to claim 10, further comprising an adhesive applying substation, which comprises: a top guide roller; a bottom guide roller; an epoxy container; an epoxy pump; and an epoxy applicator.

12. The system according to claim 4, wherein said base item application station comprises a base item supply subsystem configured to provide said base item.

13. The system according to claim 4, wherein said base item supply subsystem comprises a base item roll and a feed roller.

14. The system according to claim 4, further comprising an embedding/embossing station configured to embed or emboss the print on said laminated printed sheets, wherein said embedding/embossing station is aligned with said laminating station on said platform.

15. The system according to claim 4, further comprising a perforation station to perforate a predetermined shape of the laminated printed item on said laminated printed sheets, wherein said perforation station is aligned with said laminating station on said platform.

16. The system according to claim 4, further comprising an item cutting station configured to cut a predetermined shape of the laminated printed item on said laminated printed sheets and said applied base item, wherein said cutting station is aligned with said laminating station on said platform.

17. The system according to claim 16, wherein said item cutting station comprises a punch machine configured to punch out said predetermined shape from said laminated printed sheets and said applied base item.

18. The system according to claim 16, wherein said item cutting station comprises a cutting machine to cut out said predetermined shape from said laminated printed sheets and said applied base item.

19. The system according to claim 4, further comprising a laminated sheet collection station to separate and collect sections of said laminated printed sheets that do not form part of the laminated printed item, wherein said laminated sheet collection station is aligned with said laminating station on said platform.

20. The system according to claim 4, further comprising an item collection station to allow collection of the laminated printed item, said item collection station positioned on said platform between base item application station and said transport roller station.

* * * * *